(12) United States Patent
Zhang

(10) Patent No.: US 11,995,338 B2
(45) Date of Patent: *May 28, 2024

(54) PERFORMING OPERATION ON DATA BLOCKS CONCURRENTLY AND BASED ON PERFORMANCE RATE OF ANOTHER OPERATION ON DATA BLOCKS

(71) Applicant: MICRON TECHNOLOGY, INC., Boise, ID (US)

(72) Inventor: Yang Zhang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/745,779

(22) Filed: May 16, 2022

(65) Prior Publication Data

US 2022/0276801 A1  Sep. 1, 2022

Related U.S. Application Data

(63) Continuation of application No. 16/636,303, filed as application No. PCT/CN2018/077751 on Mar. 1, 2018, now Pat. No. 11,334,278.

(51) Int. Cl.
*G06F 3/06* (2006.01)

(52) U.S. Cl.
CPC .......... *G06F 3/0653* (2013.01); *G06F 3/0604* (2013.01); *G06F 3/064* (2013.01); *G06F 3/0652* (2013.01); *G06F 3/0679* (2013.01)

(58) Field of Classification Search
CPC ...... G06F 3/0653; G06F 3/0604; G06F 3/064; G06F 3/0652; G06F 3/0679
See application file for complete search history.

(56) References Cited

U.S. PATENT DOCUMENTS 5,862,147 A   1/1999 Terauchi
6,757,800 B1   6/2004 Estakhri et al.
(Continued)

FOREIGN PATENT DOCUMENTS

CN   104834478 A   8/2015
CN   105808160 A   7/2016
(Continued)

OTHER PUBLICATIONS

Extended European Search Report dated Oct. 20, 2021 for European Patent Application No. 18907642.5-1203 / 3759582, 17 pages.
(Continued)

*Primary Examiner* — Mark A Giardino, Jr.
(74) *Attorney, Agent, or Firm* — LOWENSTEIN SANDLER LLC

(57) ABSTRACT

A system includes a memory device having a plurality of data blocks and a processing device, the processing device to perform operations identifying an erase operation being performed on a first portion of a plurality of data blocks. The operations further include determining a first rate of performance of the erase operation being performed on the first portion of the plurality of data blocks, identifying a write operation being performed on a second portion of the plurality of data blocks, and determining a second rate of performance of the write operation being performed on the second portion of the plurality of data blocks. The operations further include determining whether the second rate of performance corresponds to the first rate of performance and responsive to the second rate of performance not corresponding to the first rate of performance, adjusting the second rate of performance.

20 Claims, 5 Drawing Sheets

(56) References Cited

U.S. PATENT DOCUMENTS

| | | | |
|---|---|---|---|
| 2002/0188899 A1 | 12/2002 | Yamazaki | |
| 2010/0318749 A1 | 12/2010 | Matthews | |
| 2012/0066449 A1 | 3/2012 | Colgrove et al. | |
| 2013/0086309 A1 | 4/2013 | Lee et al. | |
| 2014/0156965 A1 | 6/2014 | Yang et al. | |
| 2016/0313914 A1 | 10/2016 | Koets | |
| 2017/0177218 A1* | 6/2017 | Kanno | G06F 3/0688 |
| 2018/0088810 A1* | 3/2018 | Ramalingam | G06F 3/0659 |
| 2020/0394133 A1* | 12/2020 | Carpenter | G06F 3/0608 |

FOREIGN PATENT DOCUMENTS

| | | |
|---|---|---|
| CN | 107346214 A | 11/2017 |
| CN | 107636766 A | 1/2018 |

OTHER PUBLICATIONS

PCT International Search Report and Written Opinion for International Application No. PCT/CN2018/077751, dated Oct. 17, 2018, 9 pages.

Office Action for Chinese Patent Application No. 201880091649.5, mailed Dec. 12, 2023, 6 pages.

\* cited by examiner

PERFORMING OPERATION ON DATA BLOCKS CONCURRENTLY AND BASED ON PERFORMANCE RATE OF ANOTHER OPERATION ON DATA BLOCKS

RELATED APPLICATION

This application is a continuation of and claims priority to U.S. patent application Ser. No. 16/636,303, filed Feb. 3, 2020, which claims priority to PCT Application No. PCT/CN2018/077751, filed Mar. 1, 2018. The entire contents of both are hereby incorporated by reference.

TECHNICAL FIELD

The present disclosure generally relates to a storage system, and more specifically, relates to performing an operation on data blocks concurrently and based on a performance rate of another operation on the data blocks.

BACKGROUND

A storage system (e.g., solid-state drive) can include one or more memory components that store data. For example, the storage system may include memory devices such as non-volatile memory devices. The storage system may further include a controller that may manage each of the memory devices and allocate data to be stored at the memory devices. A host system may utilize the storage system and request data from the storage system. The controller may be used to retrieve data from the corresponding memory devices and return the retrieved data to the host system.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
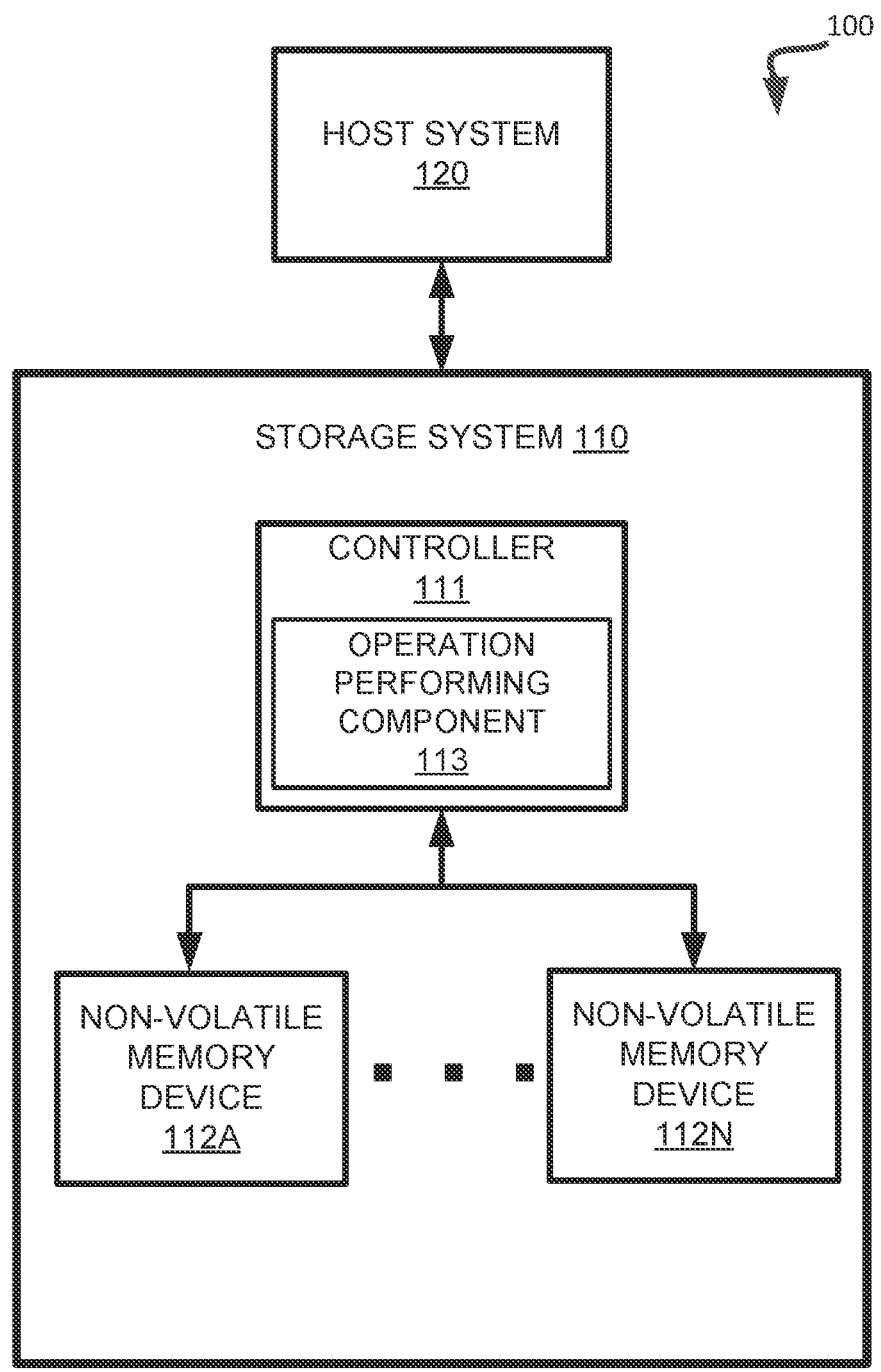
FIG. 1 illustrates an example computing environment that includes a storage system in accordance with some embodiments of the present disclosure.

Aspects of the present disclosure are directed to performing an operation on data blocks concurrently and based on a performance rate of another operation on the data blocks. In general, a host system may utilize a storage system that includes one or more memory devices. An example of a storage system is a solid-state drive (SSD). The host system can provide data to be stored at the storage system. The data may be stored and retrieved from the memory devices within the storage system. The data may also be erased from the memory devices within the storage system.

The storage system can include one or more memory devices (e.g., non-volatile memory devices). A host system can instruct the storage system to perform an operation on the non-volatile memory. For example, the host system can instruct the storage system to perform a write operation to store data at the storage system, perform a read operation to retrieve data stored at the storage system, or perform an erase operation to remove data stored at the storage system. The storage system may then identify the corresponding data associated with the specified operation and perform the specified operation at the corresponding memory device.

Generally, when an erase operation is performed on data stored at the memory device, the erase operation can be performed on an entire memory cell of the memory device. Conversely, a write operation or a read operation can be performed on a portion of the memory cell. Therefore, performing an erase operation on an SSD may typically take a longer amount of time to perform than a write operation. Furthermore, the performance of a write operation on the memory device may include a read operation. For example, once data is provided for storage at the memory device, a read operation may be performed to verify that the data has been correctly stored at the memory device.

While a storage system is performing an operation (e.g., write, read, erase), the storage system can receive another instruction from the host system to perform another operation (e.g., write, read, erase). When a conventional storage system is performing an operation and receives another instruction to perform another operation, the conventional storage system may suspend the current operation and perform the newly requested operation in order to decrease the time to store data at the storage system and retrieve data stored at the storage system. For example, a conventional storage system may be performing an erase operation at a group of data blocks at the storage system, and may receive an instruction to perform a write operation at a particular data block of the group of data blocks being used for the erase operation. The conventional storage system may suspend the erase operation at the group of data blocks, perform the write operation at the particular data block, and then resume the erase operation at the group of data blocks. Similarly, a conventional storage system may be performing a write operation at a group of data blocks at the storage system, and may receive an instruction to perform a read operation at the group of data blocks being used for the write operation. The conventional storage system may suspend the write operation, perform the read operation at the group of data blocks, and then resume the write operation at the group of data blocks.

As new instructions are instructions are being received, conventional storage systems may continue to suspend a current operation, perform a newly requested operation, and resume the current operation when the new requested operation is complete, which may result in multiple nested operations. For example, the suspension of both an erase operation and a write operation generally results in a nested suspend scenario, where multiple operations are concurrently suspended in order to perform a read operation. For instance, while a storage system is performing an erase operation, the storage system may receive an instruction to perform a write operation. The storage system may then suspend the erase operation and begin performing the write operation. While performing the write operation, the storage system may receive a second instruction to perform a read operation, and may suspend the write operation and perform the read operation. Then, once the read operation is complete, the storage system may resume the write operation, and once the write operation is complete, the storage system may resume the erase operation. Such a scenario may result in a long sequence of commands to be performed at the group of data blocks in the firmware of the storage system, increasing the latency and overhead of the storage system.

Aspects of the present disclosure address the above and other deficiencies by performing a write operation based on a rate of an erase operation being performed on one or more data blocks. The present disclosure describes dividing data blocks of a storage system into multiple portions. Data associated with a write operation and/or an erase operation can be stored at one or more of the portions of the data blocks. For example, the storage system may receive a request to perform an erase operation to erase data currently stored at three different portions of the data blocks. The storage system may also receive a request to perform a write operation to store data at three different portions of the data blocks.

The present disclosure describes using the different portions of the data blocks to perform multiple operations (e.g., erase, write) at the same time without having to suspend any of the operations (e.g., erase, write). For example, when the storage system is performing an erase operation on a first portion of the plurality of data blocks the storage system may receive an instruction to perform a write operation. The storage system can perform the write operation on a second portion of the data blocks while performing the erase operation on the first portion of the data blocks. Therefore, the write operation may be performed on a different portion of a group of data blocks at a same time as the erase operation is being performed on another portion of the group of data blocks without suspending the performance of the erase operation.

Because the erase operation may have a longer programming time than the write operation when performing the respective operation on the same number of data blocks or memory cells, the controller can adjust the rate of the write operation to correspond to the rate of the erase operation. For example, if the erase operation has a rate of 50 megabytes per second (MB/s), then the storage system can adjust the rate of the write operation to 50 MB/s. Adjusting the rate of the write operation on the second portion to correspond to the erase operation on the first portion can allow the erase operation to complete prior to the completion of the write operation on the second portion. When the erase operation has been completed on the first portion, the write operation can proceed to provide data to the first portion once the write operation has completed providing data to the second portion. By adjusting the rate of the write operation to correspond to the erase operation, the write operation can be performed on the second portion concurrently with the erase operation on the first portion without suspending the erase operation.

Thus, performing a write operation based on a rate of an erase operation being performed on data blocks can result in improved performance of the storage system by preventing the occurrence of nested suspend operations. By adjusting the rate of performance of the write operation to correspond to the rate of performance of the erase operation, the write operation and the erase operation can be performed on different portions of the memory device concurrently. This can result in the completion of both the write operation and the erase operation in a shorter amount of time than if the write operation and erase operation were performed sequentially. Furthermore, performing the write operation based on the rate of the erase operation can prevent the suspension of the erase operation when an input corresponding to a write operation is received. As a result, the performance of the storage system can be improved by decreasing the latency of the storage system and reducing overhead.

FIG. 1 illustrates an example computing environment 100 that includes a storage system 110, in accordance with some embodiments of the present disclosure. An example of a storage system 110 is a solid-state drive (SSD). In general, the computing environment 100 can include a host system 120 that uses the storage system 110. For example, the host system 120 may write data to the storage system 110 and read data from the storage system 110.

The host system 120 can be a computing device such as a desktop computer, laptop computer, network server, mobile device, or such computing device that includes a memory and a processing device. The host system 120 can include or be coupled to the storage system 110 so that the host system 120 can read data from or write data to the storage system 110. The host system 120 can be coupled to the storage system 110 via a physical host interface. As used herein, "coupled to" generally refers to a connection between components, which may be an indirect communicative connection or direct communicative connection (e.g., without intervening components), whether wired or wireless, including connections such as, electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the storage system 110. The host system 120 can further utilize an NVM Express (NVMe) interface to access the memory devices 112A to 112N when the storage system 110 is coupled with the host system 120 by the PCIe interface. The interface can provide an interface for passing control, address, data, and other signals between the storage system 110 and the host system 120.

As shown in FIG. 1, the storage system 110 can include a controller 111 and memory devices 112A to 112N. In some embodiments, the memory devices 112A to 112N are based on non-volatile memory. For example, the memory devices 112A to 112N may be a negative-and (NAND) type flash memory. Each of the memory devices 112A to 112N can include one or more arrays of memory cells such as single level cells (SLCs) or multi-level cells (MLCs) (e.g., triple level cells (TLCs) or quad-level cells (QLCs)). In some embodiments, a particular memory device includes both SLC memory cells and MLC memory cells. Each of the memory cells can store one or more bits of data (e.g., data blocks) used by the host system 120. Although non-volatile memory devices such as NAND type flash memory are described, the memory devices 112A to 112N can be based on any other type of non-volatile memory or volatile memory. For example, the memory devices 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. The memory devices 112A to 112N can include any combination of the different types of non-volatile memory or volatile memory. Furthermore, the memory cells of the memory devices 112A to 112N can be grouped as memory pages or data blocks that may refer to a unit of the memory device used to store data.

The controller 111 can communicate with the memory devices 112A to 112N to perform operations such as reading data, writing data, or erasing data at the memory devices 112A to 112N and other such operations. Furthermore, the controller 111 can include hardware such as one or more integrated circuits and/or discrete components, a processing device, a buffer memory, software such as firmware or other instructions, or a combination thereof. In general, the controller 111 can receive commands or operations from the host system 120 and can convert the commands or operations into instructions or appropriate commands to achieve the desired access to the memory devices 112A to 112N. The controller 111 can be responsible for other operations such as wear leveling operations, garbage collection operations, error detection and error-correcting code (ECC) operations, encryption operations, caching operations, and address translations between a logical block address and a physical block address that are associated with the memory devices 112A to 112N. The controller 111 can further include host interface circuitry to communicate with the host system 120 via the physical host interface. The host interface circuitry can convert the commands received from the host system into command instructions to access the memory devices 112A to 112N as well as convert responses associated with the memory devices 112A to 112N into information for the host system 120.

The storage system 110 includes an operation performing component 113 that can be used to perform operations, such as an erase operation or a write operation, on memory devices 112A to 112N concurrently without suspending any of the operations. In some embodiments, the controller 111 includes at least a portion of the operation performing component 113. The operation performing component 113 can divide a group of data blocks of the memory devices 112A-N of the storage system 110 into multiple portions of data blocks. A portion can be one or more memory pages, physical data blocks, dies of a memory device, etc. of memory 112A-N that can be independently controllable by the controller 111. The operation performing component 113 can perform an erase operation on a particular portion of the group of data blocks, and can perform a programming operation (e.g., write operation) on a different portion at the same time as the erase operation without suspending the erase operation.

The operation performing component 113 can perform the second operation (e.g., write operation) at a rate that is based on the rate of the first operation (e.g., erase operation) that is being performed. For example, the operation performing component 113 may determine that the rate of the erase operation is 50 MB/s and may perform the write operation at a rate of 50 MB/s. Further details with regards to the operations of the operation performing component 113 are described below.

The storage system 110 can include additional circuitry or components that are not illustrated. For example, the storage system 110 can include a cache or buffer (e.g., DRAM) and address circuitry (e.g., a row decoder and a column decoder) that may receive an address from the controller 111 and decode the address to access the memory devices 112A to 112N.

Figure 2:
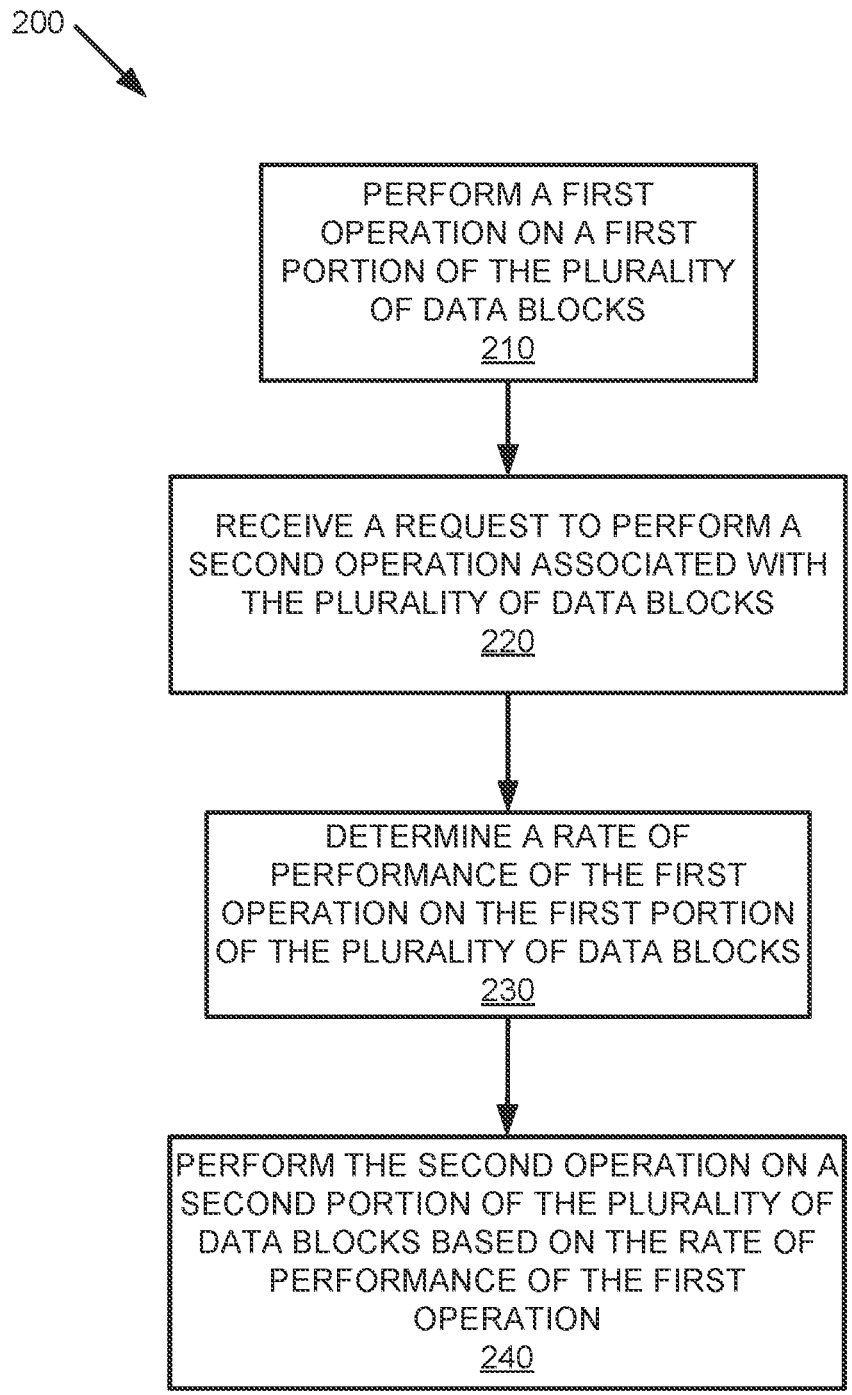
FIG. 2 is a flow diagram of an example method to perform a write operation based on a rate of performance of an erase operation in accordance with some embodiments of the present disclosure.

FIG. 2 is a flow diagram of an example method 200 to perform a write operation based on a rate of performance of an erase operation, in accordance with some embodiments of the present disclosure. The method 200 can be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the operation performing component 113 of FIG. 1.

At block 210, processing device performs a first operation on a first portion of data blocks. In an example, the first operation can be an erase operation to erase data stored at the first portion of the data blocks. The data blocks are data blocks of one or more memory devices of a storage system (e.g., SSD). The data blocks are divided into multiple portions to allow a first operation to be performed on a first portion in parallel with a second operation being performed on a second portion. A portion can be one or more memory pages, physical data blocks, and/or a dies of a memory device. In one implementation, the processing device divides the data blocks into multiple portions based on the maximum power limit of operations to be performed on a storage system, where each of the multiple portions forms a group of data blocks. For example, a storage system may have a total of 20 power units for operations to be performed on the storage system. The processing device can assign half (e.g., 10) of the power units to a first portion (e.g., first group) for the performance of an erase operation on the first portion and half of the power units to a second portion (e.g., second group) for the performance of a write operation on the second portion. The power units may thus correspond to a capability of the storage system to perform erase operations and/or write operations. In implementations, the processing device can divide the data blocks into any number of portions (e.g., groups) and each of the groups can vary in size. For example, the processing device can divide the data blocks into three groups, with the first group including 8 dies of a memory device, the second group including 10 dies of the memory device and the third group including 12 dies of the memory device. When an erase and/or write operation is being performed on one of the groups, the processing device assigns the power units accordingly. For example, if a write operation is being performed on the first group, an erase operation is being performed on the second group and the third group is idle (e.g., no operations being performed), then the processing device assigns 10 power units to the first group, 10 power units to the second group and 0 power units to the third group.

Examples of operations include an erase operation and a write operation. For example, the first operation can be an erase operation to erase data that is stored at a set of portions of the data blocks. For instance, the data blocks may be divided into three portions, such as portion A, portion B, portion C, and the erase operation may be for erasing data that is stored at portion B and portion C.

At block 220, processing device receives a request to perform a second operation associated with the data blocks. The request can be received from a host system. The request can be received during performance of the first operation. The first operation and second operation can be different types of operations. For example, the first operation may be an erase operation and the second operation may be a write operation. The request can include data for the second operation. For, example, the request can include data to be stored at the data blocks. The second operation can be related to the data blocks being used for the first operation. For example, the request may be to store the data for write operation at one or more data blocks that are being used for the first operation.

At block 230, processing device determines a rate of performance of the first operation on the first portion of the data blocks. In one embodiment, the rate of performance is represented as an amount of data per time for performing the operation. For example, the rate may be represented as MB/s for operations (e.g., erasing, storing) with data on data blocks. In another embodiment, the rate of performance is an amount of time until completion of the operation on the particular portion or all of the portions in the set of portions of the data blocks.

At block 240, processing device performs the second operation on a second portion of the data blocks based on the rate of performance of the first operation. For example, the processing device may perform the second operation at a rate of the rate of performance of the erase operation. For example, in an example where the second operation is a write operation, the storage system can store the data provided by the host system for the write operation in a buffer memory of the storage system. The processing device can use the buffer as a throttle to control the rate of retrieving the data from the buffer and storing the data at the second portion of the data blocks to adjust the rate of performing the write operation based on the rate of performance of the erase operation.

An operation can involve performing the operation on a set of portions of the data blocks. For example, a write operation may be for storing particular data to a set of portions (e.g., portion A, portion B, and portion C) of the data blocks. In another example, an erase operation may be for erasing particular data that is stored at a set (e.g., portion B and portion C) of portions of the data blocks. In some implementations, processing device can receive an indication that an operation on a particular portion of a set of portions is complete. The processing device can receive a signal or message from a memory device as an indication. In response to receiving that indication, processing device can begin performing an operation on a different portion in the set of portions.

For example, for erase operations, the processing device can receive an indication that data stored at a particular portion (e.g., portion B) for the erase operation has been erased, and can begin erasing data on another portion (e.g., portion C) in the set of portion of the data blocks.

In another example, for write operations, the processing device can receive an indication that the write operation for storing data at a particular portion (e.g., portion A) is complete, and can begin performing the write operation on a different portion (e.g., portion B) of the set of portions of the data blocks.

In some implementations, processing device can receive an indication that an operation on a particular portion of a set of portions is complete, and in response to receiving that indication, processing device can begin performing a different operation on the same particular portion. For example, processing device can receive an indication that the data stored at a particular portion (e.g., portion A) has been erased for an erase operation, and can begin performing a write operation to store data, as specified by the write operation, on the same particular portion (e.g., portion A). In some implementations, the processing device receives indications until operations have been formed on all portions in set of portions for a corresponding operation.

Figure 3:
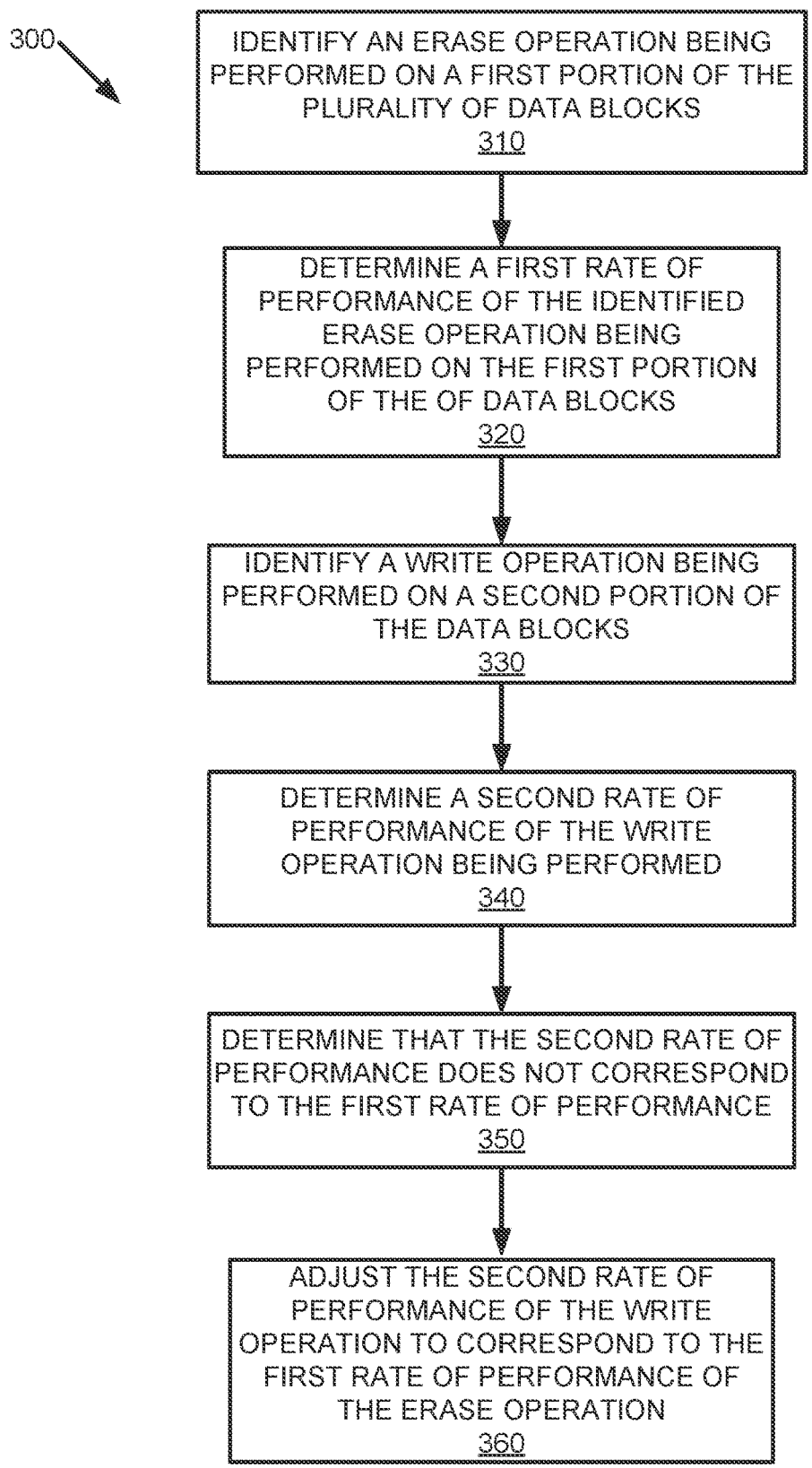
FIG. 3 is a flow diagram of an example method to adjust a rate of performance of a write operation based on a performance rate of an erase operation in accordance with some embodiments of the present disclosure.

FIG. 3 is a flow diagram of an example method 300 to adjust a rate of performance of an operation on a portion of data blocks based on a performance rate of another operation, in accordance with some embodiments of the present disclosure. The method 300 can be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the operation performing component 113 of FIG. 1.

At block 310, processing device identifies an erase operation being performed on a first portion of data blocks. In one implementation, the processing device identifies the erase operation being performed on the first portion of the data blocks in response to receiving an input corresponding to a write operation specifying data to be stored at the data blocks. At block 320, processing device determines a first rate of performance of the erase operation being performed on the first portion of the data blocks. In one embodiment, the rate of performance is represented as an amount of data per time for performing the operation. For example, the processing device may determine that the first rate of performance of the erase operation is 50 MB/s. In some implementations, the first rate of performance of the erase operation on the first portion of the data blocks is an amount of time until completion of the erase operation on the first portion of data blocks. For example, the processing device may determine that the first rate of performance of the erase operation on the first portion of the data blocks is 5 seconds.

At block 330, processing device identifies a write operation being performed on a second portion of the data blocks. At block 340, processing device determines a second rate of performance of the write operation being performed. For example, the processing device may determine that the second rate of performance of the write operation is 60 MB/s. In some implementations, the second rate of performance of the write operation is an amount of time until completion of the write operation on the second portion of the data blocks. For example, the processing device may determine that the second rate of performance of the write operation on the second portion of the data blocks is 4 seconds.

At block 350, processing device determines that the second rate of performance of the write operation does not correspond to the first rate of performance of the erase operation. In one implementation, the second rate of performance does not correspond to the first rate of performance if the second rate of performance is greater than or less than the first rate of performance. In another example, the processing device may determine the amount of time until completion of the write operation (e.g., 4 seconds) is less than the amount of time until completion of the erase operation (e.g., 5 seconds). In some implementations, the second rate of performance does not correspond to the first rate of performance if the second rate of performance is not within a threshold of the first rate of performance. For example, if the first rate of performance is 50 MB/s, the second rate of performance is 60 MB/s and the threshold is 5 MB/s, then the second rate of performance is not within the threshold.

At block 360, processing device adjusts the second rate of performance of the write operation to correspond to the first rate of performance of the erase operation. In one implementation, the processing device may adjust the second rate of performance of the write operation to be less than or equal to the first rate of performance of the erase operation. For example, if the first rate of performance of the erase operation is 50 MB/s, then the processing device may adjust the second rate of performance of the write operation from 60 MB/s to be 50 MB/s or less. In another implementation where the rate of performance is an amount of time until completion, the processing device may adjust the second rate of performance of the write operation to be greater than or equal to the first rate of performance of the erase operation. For example, if the erase operation on the first portion of the plurality of data blocks has 5 seconds remaining until completion, then the processing device may adjust the second rate of performance of the write operation on the second portion of the plurality of data blocks so that the write operation is completed in 5 or more seconds. In some implementations, when the second rate of performance of the write operation is adjusted, data received from a host system that is associated with the write operation is stored on a buffer until the data is ready to be stored on the storage system by the write operation.

Figure 4:
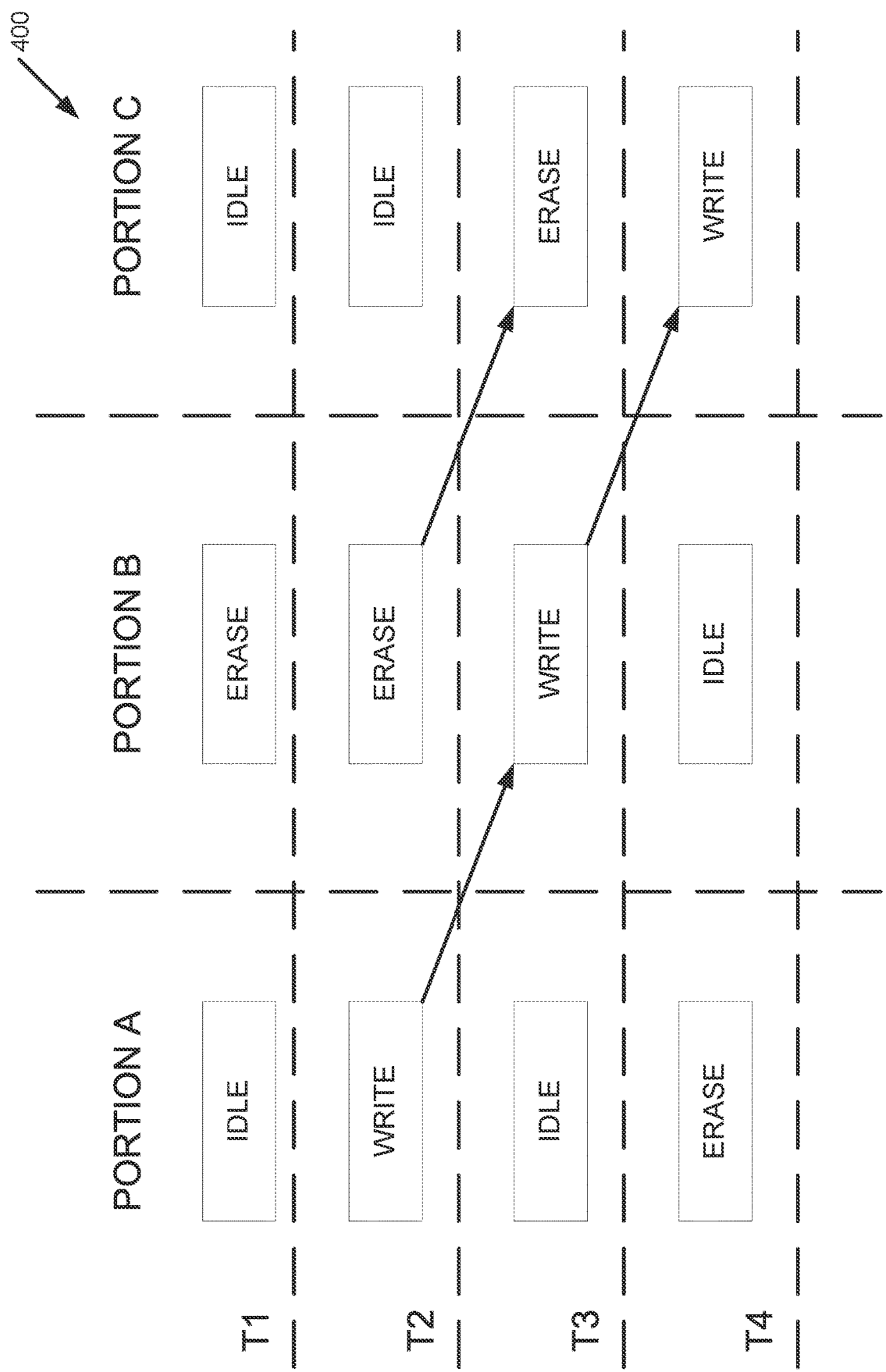
FIG. 4 illustrates an example of performing operations on a plurality of data blocks of a storage system in accordance with some embodiments of the present disclosure.

FIG. 4 illustrates a block diagram 400 of an example of performing operations on portions of data blocks of a storage system, in accordance with some embodiments of the present disclosure. In some implementations, the operations are performed by operation performing component 113 of FIG. 1.

The data blocks of a storage system are divided into multiple portions. In this example, the data blocks are divided into three portions (e.g., portion A, portion B and portion C). Each of the three portions includes one or more data blocks of the storage system. For example, portions A-C may each include 10 data blocks of the data blocks. In some implementations, portions A-C include different amounts of data blocks. For example, portion A may include 10 data blocks, portion B may include 8 data blocks and portion C may include 12 data blocks. In implementations, portions A-C may include a number of dies of the storage system. For example, in a storage system including 32 dies, portion A may include dies 0-9, portion B may include dies 10-19 and portion C may include dies 20-31.

In one embodiment, the portions can be divided based on the total number of power units of the storage system that can be assigned to the dies to perform operations. The portions can be divided so that the sum of the number of dies any two portions (e.g., portions A-C) do not exceed the total power units available. For example, if 22 power units are available to be assigned to operations to be performed on 22 dies of the storage system, then each or portions A-C can be divided into groups of 11 or less dies. Thus, the sum of the number of dies of any two of portions A-C does not exceed the total power units (e.g., 22) that are available.

At time T1, processing device performs an erase operation on portion B of the data blocks. Although the present example is written with the erase operation beginning at portion B, in other implementations the erase operation may begin performance at any one of portions A-C of the storage system. The erase operation can be performed sequentially on each portion of the storage system. For example, the erase operation can be performed on portion B, then portion C, followed by portion A. After beginning and before completion of the performance of the erase operation at time T1, the processing device receives an input corresponding to a write operation and determines a rate of performance of the erase operation, as previously discussed.

After receiving the input and determining the rate of performance, at time T2 the processing device begins performing the write operation on portion A while the erase operation is being performed on portion B. Although the present example is written with the write operation beginning at portion A, in other implementations the write operation can begin at any portion that the erase operation is not currently being performed on. The write operation can be performed sequentially on each portion of the storage system. For example, the write operation can be performed on portion A, then portion B, and followed by portion C. As previously discussed, the processing device can adjust the rate of performance of the write operation on portion A to correspond to the rate of performance of the erase operation on portion B, allowing sufficient time for the erase operation to complete on portion B. Upon completion of the erase operation on portion B, at time T3 the processing device begins performing the erase operation on portion C of the storage system. Upon completion of the write operation on portion A, at time T3 the processing device begins performing the write operation on portion B that is no longer being operated on by the erase operation. At a later time T4, data stored at portion A may no longer be used by a host system or may have been copied to new locations. In order to make the data blocks of portion A available, an erase operation can be performed on portion A. The processing device can begin performing the erase operation on portion A of the storage system. Upon completion of the write operation on portion B, at time T4 the processing device begins performing the write operation on portion C that is no longer being operated on by the erase operation.

Figure 5:
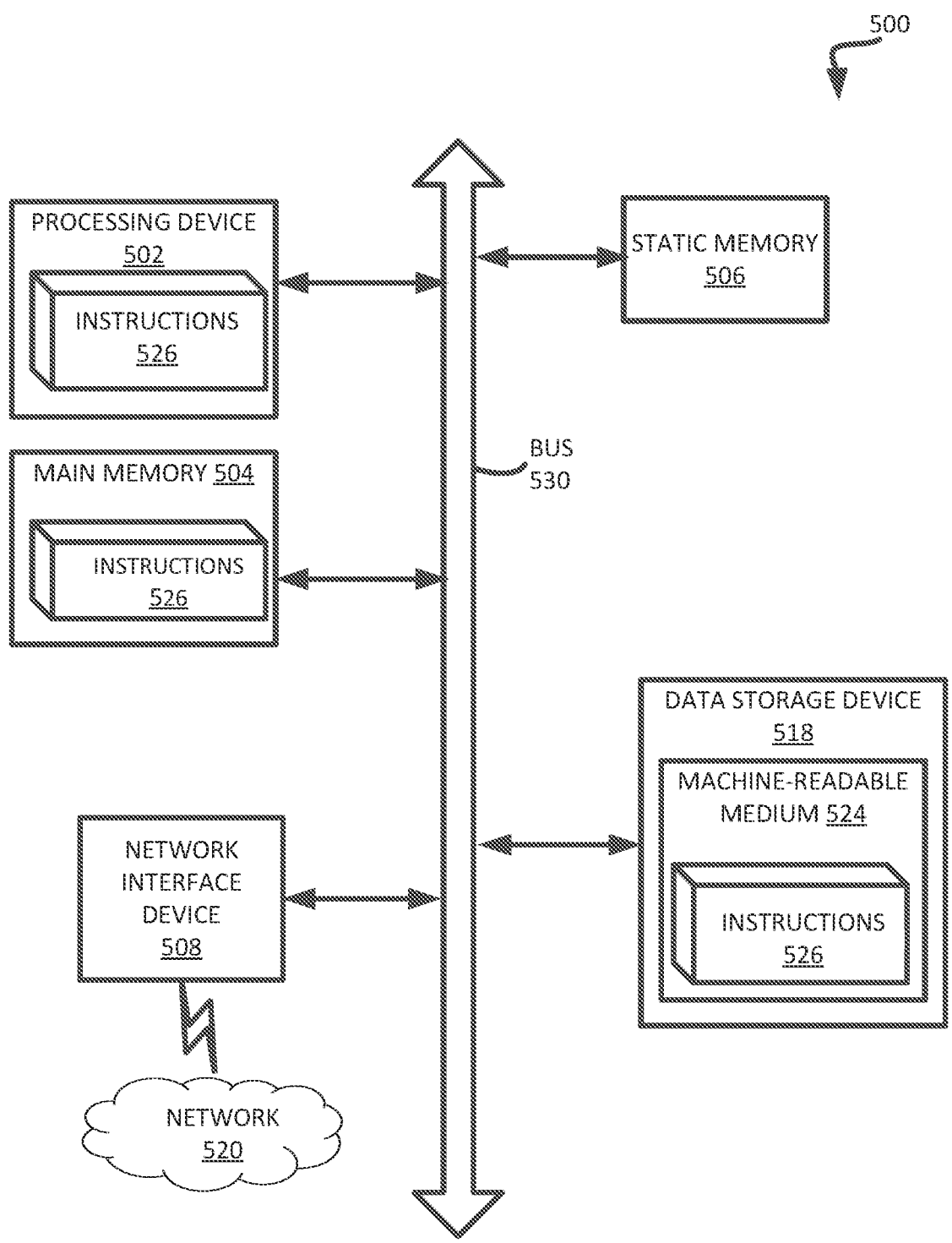
FIG. 5 is a block diagram of an example computer system in which implementations of the present disclosure may operate.

FIG. 5 illustrates an example machine of a computer system 500 within which a set of instructions, for causing the machine to perform any one or more of the methodologies discussed herein, may be executed. For example, the computer system 500 may correspond to a host system (e.g., the host system 120 of FIG. 1) that includes or utilizes a storage system (e.g., the storage system 110 of FIG. 1) or may be used to perform the operations of a controller (e.g., to execute an operating system to perform operations corresponding to the operation performing component 113 of FIG. 1). In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 may further include a network interface device 508 to communicate over the network 520.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media. The machine-readable storage medium 524, data storage device 518, and/or main memory 504 may correspond to the storage system 110 of FIG. 1.

In one implementation, the instructions 526 include instructions to implement functionality corresponding to an operation performing component (e.g., operation performing component 113 of FIG. 1). While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, aspects of the present disclosure may refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A system comprising:
 a memory device comprising a plurality of data blocks divided into portions; and
 a processing device, operatively coupled with the memory device, to perform operations comprising:
  identifying an erase operation being performed on a first portion of a plurality of data blocks;
  determining a first rate of performance of the erase operation being performed on the first portion of the plurality of data blocks;
  identifying a write operation being performed on a second portion of the plurality of data blocks;
  determining a second rate of performance of the write operation being performed on the second portion of the plurality of data blocks;
  determining whether the second rate of performance corresponds to the first rate of performance; and responsive to the second rate of performance not corresponding to the first rate of performance, adjusting the second rate of performance.

2. The system of claim 1, wherein the operations further comprise adjusting the second rate of performance of the write operation to correspond to the first rate of performance of the erase operation.

3. The system of claim 1, wherein the operations further comprise:
receiving an input corresponding to a write operation indicating data to be stored at the plurality of data blocks, wherein the processing device is to identify the erase operation responsive to receiving the input.

4. The system of claim 1, wherein the first rate of performance represents an amount of data per time for performing the erase operation.

5. The system of claim 4, wherein the operations further comprise:
adjusting the second rate of performance of the write operation to be less than or equal to the first rate of performance of the erase operation.

6. The system of claim 1, wherein the first rate of performance represents an amount of time until completion of the erase operation on the first portion of data blocks.

7. The system of claim 6, wherein the operations further comprise:
adjusting the second rate of performance of the write operation to be greater than or equal to the first rate of performance of the erase operation.

8. The system of claim 1, wherein determining whether the second rate of performance corresponds to the first rate of performance comprises:
determining whether the second rate of performance is within a threshold of the first rate of performance.

9. The system of claim 1, wherein the operations further comprise:
storing data associated with the write operation at a buffer; and
responsive to adjusting the second rate of performance, performing the write operation to write the data to the second portion of the plurality of data blocks.

10. A method comprising:
identifying an erase operation being performed on a first portion of a plurality of data blocks;
determining a first rate of performance of the erase operation being performed on the first portion of the plurality of data blocks;
identifying a write operation being performed on a second portion of the plurality of data blocks;
determining a second rate of performance of the write operation being performed on the second portion of the plurality of data blocks;
determining whether the second rate of performance corresponds to the first rate of performance; and
responsive to the second rate of performance not corresponding to the first rate of performance, adjusting the second rate of performance.

11. The method of claim 10, further comprising:
receiving an input corresponding to a write operation indicating data to be stored at the plurality of data blocks, wherein identifying the erase operation is responsive to receiving the input.

12. The method of claim 10, wherein the first rate of performance represents an amount of data per time for performing the erase operation.

13. The method of claim 12, further comprising:
adjusting the second rate of performance of the write operation to be less than or equal to the first rate of performance of the erase operation.

14. The method of claim 10, wherein the first rate of performance represents an amount of time until completion of the erase operation on the first portion of data blocks.

15. The method of claim 10, further comprising:
adjusting the second rate of performance of the write operation to be greater than or equal to the first rate of performance of the erase operation.

16. The method of claim 10, further comprising:
determining whether the second rate of performance is within a threshold of the first rate of performance.

17. A non-transitory computer-readable storage medium comprising instructions that, when executed by a processing device, cause the processing device to perform operations comprising:
identifying an erase operation being performed on a first portion of a plurality of data blocks;
determining a first rate of performance of the erase operation being performed on the first portion of the plurality of data blocks;
identifying a write operation being performed on a second portion of the plurality of data blocks;
determining a second rate of performance of the write operation being performed on the second portion of the plurality of data blocks;
determining whether the second rate of performance corresponds to the first rate of performance; and
responsive to the second rate of performance not corresponding to the first rate of performance, adjusting the second rate of performance.

18. The non-transitory computer-readable storage medium of claim 17, wherein the first rate of performance represents an amount of data per time for performing the erase operation.

19. The non-transitory computer-readable storage medium of claim 18, wherein the operations further comprise:
adjusting the second rate of performance of the write operation to be less than or equal to the first rate of performance of the erase operation.

20. The non-transitory computer-readable storage medium of claim 17, wherein the first rate of performance represents an amount of time until completion of the erase operation on the first portion of data blocks, and wherein the operations further comprise:
adjusting the second rate of performance of the write operation to be greater than or equal to the first rate of performance of the erase operation.

* * * * *